No. 670,844. Patented Mar. 26, 1901.
N. A. COBB.
PHOTOGRAPHIC SHUTTER.
(Application filed May 7, 1900.)
(No Model.) 3 Sheets—Sheet 1.
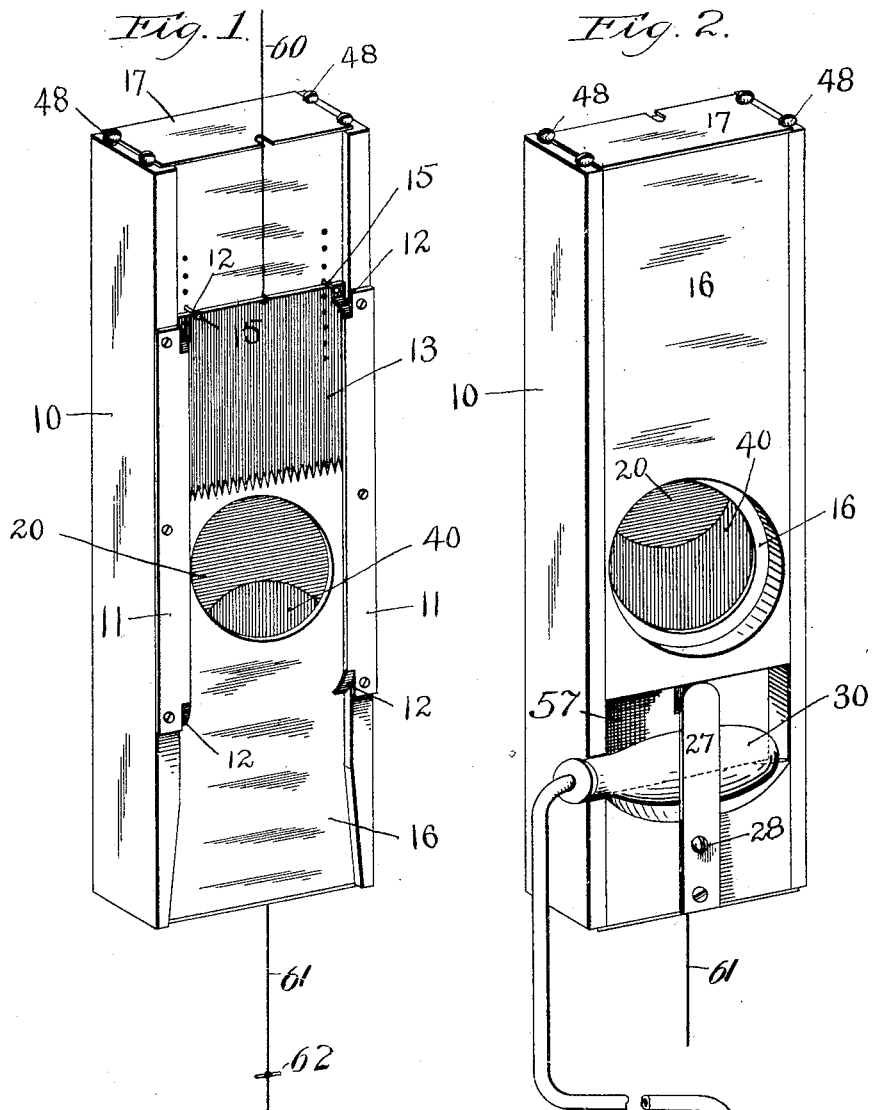
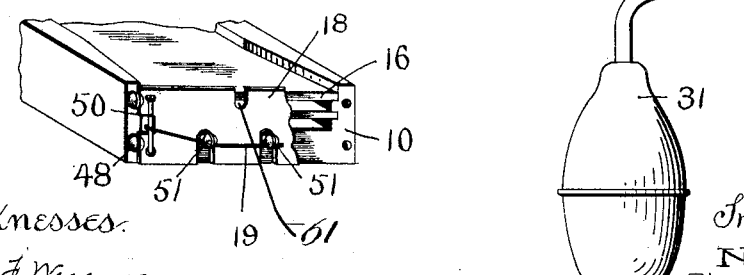
Witnesses
C. F. Wesson
M. E. Regan
Inventor.
N. A. Cobb
BY
Southgate & Southgate
Attorneys.
THE NORRIS PETERS CO., PHOTO-LITHO., WASHINGTON, D. C.

No. 670,844. Patented Mar. 26, 1901.
N. A. COBB.
PHOTOGRAPHIC SHUTTER.
(Application filed May 7, 1900.)
(No Model.) 3 Sheets—Sheet 2.

Witnesses
C. F. Wasson
M. E. Regan

Inventor
N. A. Cobb
By Southgate & Southgate
Attorneys

THE NORRIS PETERS CO., PHOTO-LITHO., WASHINGTON, D. C.

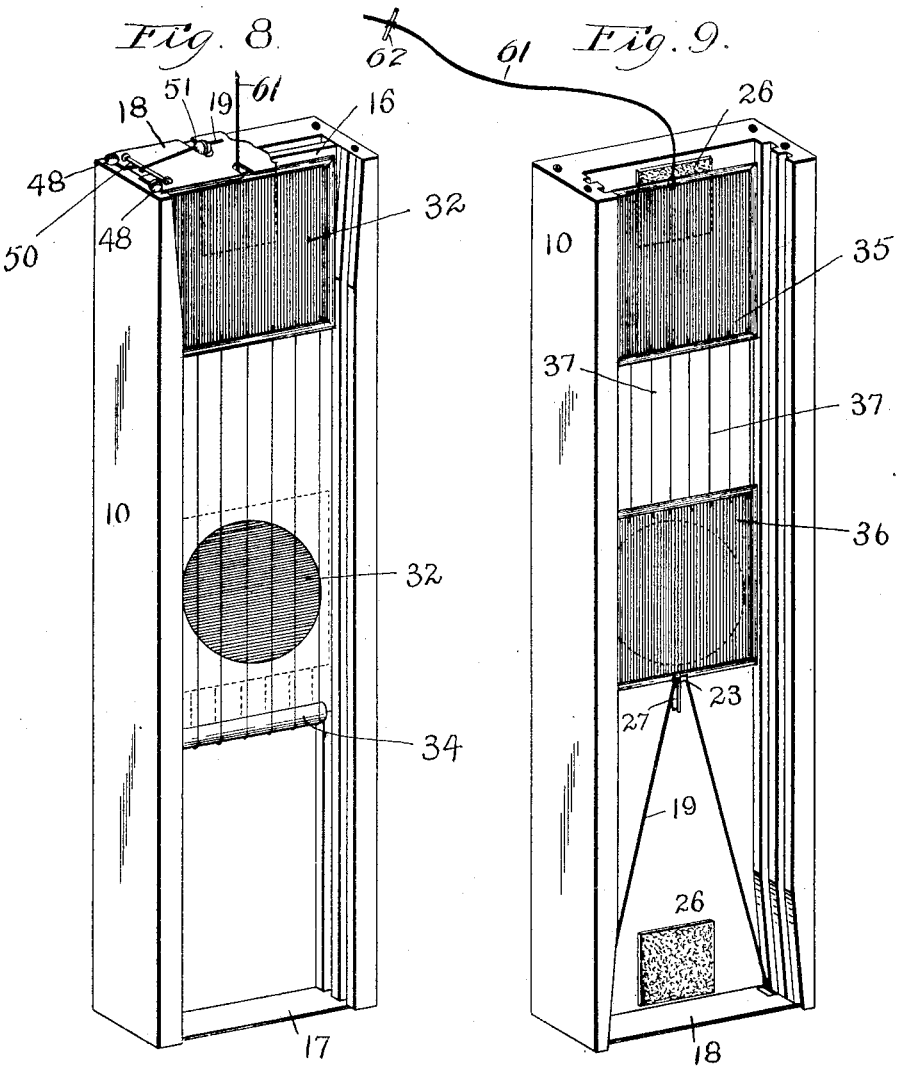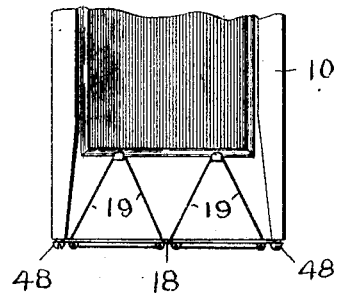

UNITED STATES PATENT OFFICE.

NATHAN A. COBB, OF SYDNEY, NEW SOUTH WALES.

PHOTOGRAPHIC SHUTTER.

SPECIFICATION forming part of Letters Patent No. 670,844, dated March 26, 1901.

Application filed May 7, 1900. Serial No. 15,691. (No model.)

*To all whom it may concern:*

Be it known that I, NATHAN A. COBB, a citizen of the United States, residing at Sydney, in the county of Cumberland, New South Wales, have invented a new and useful Photographic Shutter, of which the following is a specification.

The object of this present invention is to provide a small, light, durable, and inexpensive photographic shutter; and the especial object of this invention is to provide a photographic shutter which will work equally well in any position in front of, between, or behind the lenses and which may be used upright, inverted, or sidewise and to arrange the working parts of the shutter so that interchangeable blades or slides may be employed for giving the plate any desired illumination, either of uniform intensity over the whole surface exposed or different degrees of intensity upon different parts exposed, and to employ working parts in the shutter which are sufficiently light and are mounted in such a manner as to be capable of highly-efficient operation, securing the exposures as short as two one-thousandths of a second in duration.

To these ends this invention consists of the parts and combinations of parts, as hereinafter described, and more particularly pointed out in the claims at the end of this specification.

Figure 4:
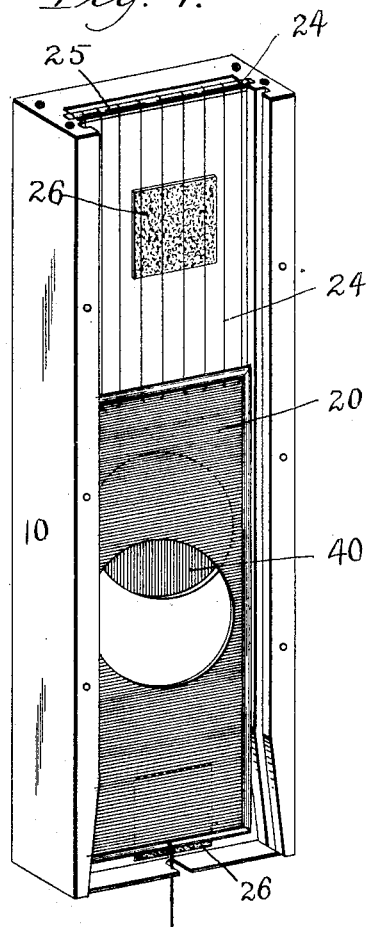
Figure 5:
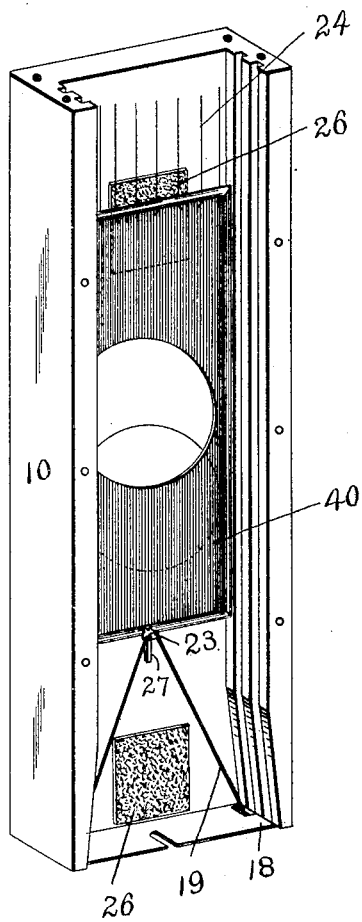
Figure 6:
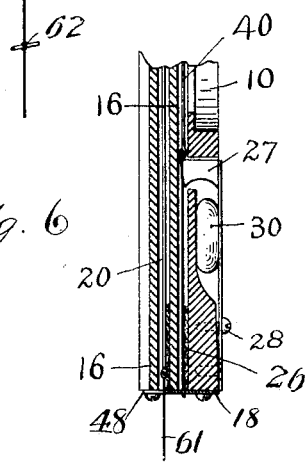
Figure 7:
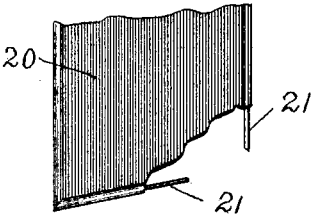

In the accompanying three sheets of drawings, Figure 1 is a perspective front view of a photographic shutter constructed according to this invention. Fig. 2 is a perspective rear view thereof. Fig. 3 is a partial perspective bottom view of the shutter. Fig. 4 is a view similar to Fig. 1 with the top plate, safety-slide, and front partition removed, so as to show the parts contained in the front cell of the shutter-casing. Fig. 5 is a similar view with both partitions removed, so as to show the parts contained in the rear cell of the shutter-casing. Fig. 6 is a fragmentary transverse sectional view illustrating the spring-catch for setting the shutter. Fig. 7 is a fragmentary perspective view illustrating the construction of the paper slides or blades. Fig. 8 is a perspective view illustrating the parts which may be substituted for the slides illustrated in the first two sheets of drawings when it is desired to have the shutter act as a sky-shutter, which will give more illumination to the foreground than to the upper part of the image. Fig. 9 is a view similar to Fig. 5, illustrating the form of slide which would be employed to constitute a shutter which will operate at the highest possible rate of speed; and Fig. 10 is a detail view illustrating the manner in which a number of spring-bands may be employed when it is desired to distribute the strain across the width of the movable blades or slides.

In the first two sheets of drawings I have illustrated the arrangement of parts in a shutter constructed according to my invention, in which the shutter acts as a center-opening shutter—that is to say, in the first two sheets of drawings the arrangement of parts is such that light is first admitted near the center of the lens while the shutter is opening and the light at the center of the lens is the last to be cut off when the shutter is closing.

As shown in the first two sheets of drawings, a photographic shutter constructed according to this invention comprises a main casing or wooden frame 10. The casing 10 consists, preferably, of a longitudinally-grooved block or wooden frame. At the front the casing 10 is provided with metallic strips 11, forming guides for a safety-cap or shut-off slide 13. The guides 11 are provided at their ends with turned-in or stop sections 12, which act as springs for holding the supplemental or safety slide 13 in position at either side of the shutter-opening. The safety slide or cap 13 is designed to cover the shutter-opening when the shutter is being set or the parts thereof moved in position ready to be sprung. In addition to its use as a safety cap or cover the slide 13 is designed to be used to secure complete hand exposures or partial preliminary exposures over a portion of the plate when it is desired to secure shading or different degrees of exposure on different parts of the plate. For this purpose one edge of the safety-slide 13 is preferably serrated or provided with indentations, as shown. Coöperating with the safety-slide 13 are stop-pins 15, which may be set into holes, as shown, or may be adjusted to form a stop, limiting the height to which the slide 13 can be raised. The manner in which these parts are used to secure the shading or different degrees of exposure on different parts of a plate is as follows: When it is desired, for example, to secure full detail and exposure of the sky and highly-lighted distant objects without underexposing the objects in the immediate foreground, this can be done by first focusing a camera and then moving the slide 13 up and down while the shutter is open to cut off more or less light from the background and sky of the picture, as desired. When the proper height to which the slide 13 should be raised is determined, the pins 15 are adjusted to form a stop, limiting the upward motion of the slide 13 at the desired point. The slide 13 is then lowered to cover the shutter-opening, and a sensitive plate is substituted for the ground-glass focusing-screen in the ordinary manner. By then raising the slide 13 a partial exposure of the plate will be made, after which the slide 13 is again lowered to cover the shutter-opening and the shutter is set or cocked and a second exposure made over the entire plate, the combined result of two such exposures being that a picture more or less shaded to bring out the detail and clearness of distant objects desired may be secured. The slide 13 may be moved up and down by a cord 60.

As shown most clearly in Figs. 3, 4, and 5, the shutter-casing is provided with grooves or rabbets for receiving partitions dividing the shutter-casing 10 into two or more cells. The partitions 16 are preferably formed of thin pieces of wood with the grain thereof running crosswise, so as to be less liable to swell or warp from changes in moisture. The partitions 16 are removably held in place by top and bottom plates 17 and 18, which top and bottom plates are removably secured by screws 48, so that they may be slid or slipped sidewise from beneath the heads of said screws when it is desired to open the shutter-casing to replace the removable parts of the shutter or to substitute other parts therein.

As shown most clearly in Fig. 3, the spring or endless rubber band 19 employed for actuating the movable parts of a shutter constructed according to this invention preferably extends around or incloses the bottom plate 18, and in order that the entire length of a rubber band 19 thus mounted may be employed the bottom plate 18 may be provided with small rollers or friction-bearings 50, and in order to take up more or less of the rubber band to change the tension of the shutter, and hence its time of operation, I may employ pegs or screws 51, upon which the rubber band 19 may be wrapped or taken up.

The movable ports of the shutter controlled or shifted by the rubber band 19 may consist of one or more movable blades or slides.

In the form of shutter illustrated in the first two sheets of drawings two movable blades or slides are used, one blade being mounted in the front cell or chamber of the shutter-casing and the other blade or slide being located in the rear cell or chamber of the shutter-casing.

As shown most clearly in Fig. 7, the blade or slide 20 employed in a shutter constructed according to this invention is preferably made of thin light material.

In practice I have designed the parts of shutters constructed according to this invention to employ blades or slides of paper, and I prefer to use paper for these blades or slides, as I have found that I am enabled to secure good results even by using paper as thin as one five-hundredths of an inch, and as the blades as thus constructed of thin paper are exceedingly light the weight of the movable parts of a shutter may thus be reduced to a minimum and a high-speed action secured.

To render the use of paper as the movable part of a shutter feasible, I have found that it is usually necessary to reinforce or stiffen the edges of the blades or slides.

As shown in Fig. 7, the edges of the blades or slides are preferably folded back or doubled and pasted in place, and I have found it desirable to inclose a light tempered-steel edge wire 21 within the fold at the edge of the blades, these edge wires being especially necessary at the top and bottom of the blades and not being so much required along the sides of the blades.

In the form of construction illustrated in the first two sheets of drawings a second blade 40 is mounted in the rear cell of the shutter-casing, the blades 20 and 40 being connected together by cords or bands 24.

In order to diminish the friction of the cords or bands 24, I may provide the shutter-casing with a friction roll or wheel 25, as shown most clearly in Fig. 4.

Where the lens-opening is of considerable width or the speed of the shutter very high, I have found it desirable to use a considerable number of connecting-cords 24 to connect the plates 20 and 40, and in practice these narrow connecting-cords 24, which preferably consist of fine silk threads, may be moved in front of the lens without cutting off any substantial amount of light therefrom and without appearing in the picture taken, as they are not in focus.

If a high-speed exposure is not required, the greater number of connecting-cords 24 may be dispensed with and connecting cords or bands may be used near the edges of the blades or slides alone, so as not to extend down across the lens-opening.

To connect the blade or slide 40 with its operating band or spring 19, I may employ a direct fixed connection; but I preferably use a small metallic hook 23, which is sleeved or journaled on the bottom stiffening-wire 21, as shown most clearly in Fig. 5.

When a photographic shutter is to be operated at high speed and material as fragile as paper is to be used to form the moving parts of the shutter, I have found it necessary to provide some means for checking or acting as brakes on the movable parts as they approach their limits of motion, and these brakes or retarding devices I employ to act not only at the stopping-points of the movable parts of the shutter, but also to act on the blades at their extreme other ends of position, so as to hold the parts in place and prevent the blades from shifting even when the shutter is inverted or turned sidewise. These brakes or holding devices for the movable blades or slides of a shutter constructed according to this invention preferably consist of small wedges of velvet 26 or other compressible material carried by the shutter-framing or by the partitions thereof, the velvet brakes or stopping devices 26 being provided to act upon each shutter-blade at each end of its limit of travel.

To hold the working parts of a shutter constructed according to this invention set or in position to be sprung, I employ a spring-catch 27, as shown most clearly in Figs. 2 and 6. The spring-catch 27 extends over a socket or recess 57 in the shutter-casing, in which socket or recess may be mounted a nipple 30, controlled from a bulb 31.

To adjust the spring-detent 27 to accommodate nipples of different sizes and elasticities, I preferably provide an adjusting-screw 28, which may spring the detent 27 back to the desired extent or may adjust the tension of the spring to secure the desired action.

The inner end of the detent 27, extending inside of the shutter-casing, is inclined at a comparatively small angle with the line of motion of the shutter-blade under which it engages, so as to be readily moved back when the shutter is set.

To set the shutter, I may employ a cord 61, and the cord 61 may, if desired, be provided with a stop or knot 62.

As shown most clearly in Fig. 5, the end of the detent 27 engages beneath the hook 23, and this in practice I have found to be a point of advantage, as the hook 23 not only furnishes a metal wearing-piece which will prevent the wear of the catch 27 from coming upon the body portion of the blade or slide, but there is an additional point of advantage in utilizing the hook 23 to engage the stop 27, as the hook 23 is somewhat thicker than the paper body portion of the slide, and on this account the catch 27 has to be drawn back far enough so that there will be clearance between the catch 27 and body portion of the paper before the shutter is sprung and released, so that the catch is less liable to strike or interfere with the motion of the slide or blade as the same is moving past it.

One especial advantage in the use of a photographic shutter constructed according to this invention arises from the extreme accessibility of all parts of the shutter, which permits the ready renewal of any of the parts which become worn or broken and which permits the substitution of other parts or slides when a shutter for producing different effects is desired. For example, as shown in Fig. 8, a shorter or partial partition may be substituted for the partitions 16, which separate the two cells or compartments of the shutter-casing, so that by using two short blades or slides 32, secured together, as illustrated in this figure, a shutter may be provided which will act as a sky-shutter—that is to say, it will act to give a shorter exposure to the upper portion of a picture than to the foreground or lower portion thereof, this being effected by reason of the fact that the blades 32 are so located with respect to each other that the lower part of the lens-opening is the first to open when the shutter is sprung and is the last to close.

In the construction illustrated in Fig. 8 instead of employing a roller for the connecting-cords to run upon I provide the partition with a polished enlargement or stationary cylindrical rod 34, and in many instances I prefer to have the connecting-cords run over the stationary enlargement or polished rod 34, as illustrated, as I have found that this form may be manufactured more cheaply than the construction employing the friction-roller, and the same is somewhat more reliable in operation.

In Fig. 9 I have illustrated a still further modification which can be made of a shutter constructed according to this invention—that is to say, in Fig. 9 I have illustrated what I sometimes term a "straightaway shutter," in which the motion of the moving parts is in a single straight line, and as there is no necessity for carrying the connecting-cords around a corner the shutter is capable of operating at extremely high speeds.

The movable parts of the straightaway shutter (illustrated in Fig. 9) comprise two blades or slides 35 and 36, which are located in the same cell or compartment in the shutter-casing and are connected together by strings or cords 37. The space between the blades 35 and 36 is preferably of a somewhat greater width than the width of the shutter-opening, and I prefer to arrange the parts in this manner in order to secure a high efficiency of action for the shutter—that is to say, by employing an exposing-opening between the blades or slides 35 and 36 which is longer than the shutter-opening the shutter will be wide open during the greater part of the exposure, thus fulfilling the requirement of permitting the passage of a maximum amount of light in the shortest possible time.

In some cases in order to distribute the operating strain across the width of the movable slide or blade I contemplate employing more than one operating spring or band, and I have illustrated such a construction in Fig. 10, in which two operating springs or bands are arranged to be connected at different points to the bottom of the blade or slide of the shutter, thus distributing the operating strain at different points across the width of the shutter, such an arrangement being desirable for high-speed work or when it is desired to release the strain necessarily required on a single band or spring.

I am aware that numerous other changes may be made in applying and using the novel features of a photographic shutter constructed according to my invention without departing from the scope of my invention as expressed in the claims. I do not wish, therefore, to be limited to the forms herein shown and described; but What I do claim, and desire to secure by Letters Patent of the United States, is—

1. The combination of the casing of a photographic shutter, a slide forming a safety-cap for covering the shutter-opening while the shutter is being set, and a stop for limiting the motion of said slide so that the same may be used to secure the shading or double exposure of parts of the plate when desired, substantially as described.

2. The combination of a shutter-casing, a safety-slide movably mounted thereon for covering the shutter-opening while the shutter is being set, and a stop for limiting the motion of said safety-slide, the edge of said safety-slide being indented or serrated, substantially as and for the purpose set forth.

3. The combination in a photographic shutter, of an endless band or spring for actuating the movable parts of the shutter, and take-up pegs or pins arranged to receive a fold or lap in the band when it is desired to increase the tension thereof, substantially as described.

4. In a photographic shutter, the combination of a shutter-casing, a base-plate, a spring-band encircling the base-plate, and friction rollers or wheels around which said band runs, substantially as described.

5. In a photographic shutter, the combination of a casing, a slide mounted therein and consisting of a body portion of light flexible material with reinforced or thickened edges, and means for operating said slide, substantially as described.

6. In a photographic shutter, the combination of a casing, a slide mounted therein, and consisting of a body portion of light flexible material having its edges doubled or folded back so as to stiffen and reinforce the same, and means for operating the slide, substantially as described.

7. In a photographic shutter, the combination of a casing, a slide mounted therein, and consisting of a body portion of paper having its edges doubled or folded back with stiffening-wires inclosed in the folds thus formed, and means for operating said slide, substantially as described.

8. In a photographic shutter, the combination of a slide having a stiffening-wire at its end, an operating-spring for said slide, and a hook pivoted on the stiffening-wire of the blade to provide a detachable connection between the blade and its spring, substantially as described.

9. In a photographic shutter the combination of a slide having a metallic hook adapted for connection with the operating-spring of the slide, and a detent for holding the parts in their set position, said detent being arranged to engage the hook, substantially as described.

10. In a photographic shutter, the combination of a movable slide, and two friction-brakes arranged to coöperate therewith, one friction-brake being located near each end of the limits of travel of said slide, substantially as described.

11. In a photographic shutter, the combination of a movable slide, and a friction-brake therefor, consisting of a piece of velvet arranged to be engaged by the slide as it approaches the end of its travel, whereby the slide may be gradually brought to rest without jar or strain, substantially as described.

12. In a photographic shutter, the combination of a casing having two separate compartments, a slide located in each of said compartments, and flexible cords connecting said slides, substantially as described.

13. In a photographic shutter, the combination of a casing having two separate compartments, a slide located in each of said compartments, and flexible cords connecting said slides, which connecting-cords pass in front of the lens-opening when the shutter is operating and form substantially an open web distributing the strain throughout the width of said slides, substantially as described.

14. In a photographic shutter, the combination of a shutter-casing having two separate compartments, a slide located in each of said compartments, and flexible cords connecting the slides, said strings being arranged to run over a polished enlargement, substantially as described.

In testimony whereof I have hereunto set my hand in the presence of two subscribing witnesses.

NATHAN A. COBB.

Witnesses:
PHILIP W. SOUTHGATE,
LOUIS W. SOUTHGATE.